United States Patent [19]

Schauffele

[11] Patent Number: 4,730,222
[45] Date of Patent: Mar. 8, 1988

[54] VIDEO RECORDING APPARATUS HAVING LOW AND HIGH RESOLUTION OPERATIONAL MODES

[75] Inventor: Carl N. Schauffele, Rochester, N.Y.

[73] Assignee: Eastman Kodak Company, Rochester, N.Y.

[21] Appl. No.: 725,873

[22] Filed: Apr. 22, 1985

[51] Int. Cl.[4] .............................................. H04N 5/76
[52] U.S. Cl. .................................. 358/310; 358/335; 360/8; 360/9.1; 360/33.1; 360/55
[58] Field of Search ............... 358/310, 321, 335, 338, 358/312; 360/8, 9.1, 33.1, 55

[56] References Cited

U.S. PATENT DOCUMENTS

| Re. 29,999 | 5/1979 | Hirota | 360/11 |
|---|---|---|---|
| 3,781,463 | 12/1973 | Vander Bussche | 178/5.4 |
| 4,064,540 | 12/1977 | Jetten | 358/142 |
| 4,084,181 | 4/1978 | Mita et al. | 358/12 |
| 4,127,865 | 11/1978 | Poetsch | 358/12 |
| 4,133,009 | 1/1979 | Kittler et al. | 360/9 |
| 4,163,247 | 7/1979 | Bock et al. | 358/12 |
| 4,163,248 | 7/1979 | Heitmann | 358/12 |
| 4,183,067 | 1/1980 | Kihara et al. | 360/75 |
| 4,210,927 | 7/1980 | Yumde et al. | 358/12 |
| 4,277,796 | 7/1981 | Ross | 358/312 |
| 4,300,161 | 11/1981 | Haskell | 358/142 |
| 4,335,393 | 6/1982 | Pearson | 358/4 |
| 4,376,957 | 3/1983 | Dischert et al. | 358/334 |
| 4,695,900 | 9/1987 | Honjo et al. | 358/310 |

OTHER PUBLICATIONS

6/14/82 Letter from Robert Bosch, Japan and Report Entitled "Timplex-A Serial Colour Encoding System For Home Video Recorders".
Article. . "Cost Effective Bandwidth Compression Technique for Increasing CATV System Channel Capacity".
Article. . Time Compression Multiplex Transmission; J. E. Flood, Prog., IEEE, III, No. 4 (Apr. 1964), pp. 647–648.
Articles: IEEE Trans. on Commun., Com-22, No. 12 (Dec. 1974), pp. 1932–1939; BSTJ 60, No. 9 (Nov. 1981), pp. 2167–2185.

Primary Examiner—Robert L. Richardson
Attorney, Agent, or Firm—William F. Noval

[57] ABSTRACT

Video reproduction apparatus such as a video cassette recorder which is operable in either a first conventional mode or a second high resolution mode. The apparatus includes processing circuitry for selectively processing video signals either of a first conventional format of reduced bandwidth, or of a second time-division-multiplex (TDM) format of higher bandwidth than the first format. A capstan is provided for moving magnetic tape along a path at a first speed and at a second speed greater than the first speed. A magnetic transducer carried on a drum is located along the tape path and is rotated at a first rotational speed and at a second rotational speed, greater than the first rotational speed for recording and playing back video signals in parallel tracks on the magnetic tape. Control structure and circuitry are provided for controlling the processing circuitry, the capstan, and the magnetic transducer drum so that they are operable in at least first and second modes. In the first mode, the processing circuitry processes video signals of the first format, the capstan moves the tape along the path at the first speed and the maganetic transducer drum is rotated at the first rotational speed to record and/or playback video signals of said first format on the magnetic tape. In the second mode, video signals of the second format are processed by the processing circuitry, the capstan moves the tape at the second tape speed and the magnetic transducer drum is rotated at the second rotational speed to record and/or playback video signals of the second format on the magnetic tape.

10 Claims, 9 Drawing Figures

VIDEO RECORDING APPARATUS HAVING LOW AND HIGH RESOLUTION OPERATIONAL MODES

BACKGROUND OF THE INVENTION

This invention relates in general to video reproduction apparatus such as video cassette recorders. More particularly, this invention relates to video record and-/or playback apparatus which is operable in a conventional mode at reduced signal bandwidth, and in a high resolution mode at greater signal bandwidth.

The broadcast color video signal has a broad bandwidth which is utilized only in more expensive consumer video equipment such as television receivers and video cassette recorders. Thus, the composite NTSC color television signal includes a luminance component which is broadcast at a bandwidth of approximately 4.2 MHz and I and Q chrominance components which are broadcast respectively at bandwidths of approximately 1.3 MHz and 0.5 MHz. In the consumer video market, these bandwidths have been limited to reduce equipment cost and to effect simplicity of the processing circuitry. Thus, the luminance component of the color video signal is frequently limited in bandwidth to approximately 3 MHz so that the chrominance components which are carried on a 3.58 MHz subcarrier do not interfere with the luminance component. Similarly, the I chrominance component is frequently limited in bandwidth to the bandwidth of the Q chrominance component in order to simplify the processing circuitry for the chrominance signals. This reduction in bandwidth of the luminance and chrominance components of the color video signal results in a reduction in image resolution and quality.

A reduction in the bandwidths of the color video signal components has been especially evident in consumer video cassette recorders (VCRs). Thus, although studio quality video tape recorders are capable of recording the composite video signal at full bandwidths, such equipment is bulky, expensive, and complex. Broadcast studio recorders generally use one or two-inch wide video tape which requires a bulky and heavy tape transport mechanism which is unsuitable for home video use. Thus, with the advent of relatively inexpensive VCRs for home use, the width of magnetic tape has been reduced to one-half inch (12.5 mm) in the Beta and VHS formats, and to one-third inch (8 mm) in the newer 8 mm format. Moreover, the bandwidths of the luminance component of the composite color signal is limited to approximately 2.5 MHz and of the chrominance component to 0.5 MHz in order to reduce size, cost and complexity of the VCR. Although consumer video cassette recorders generally are capable of recording video at several tape speeds, the bandwidths and consequently the resolution of the recorded signals at the different speeds is not significantly changed. Moreover, the format of the recorded video signal is the same at all speeds. In general, where the tape transport and camera have been combined into a single hand-held unit, only one tape speed (the fastest speed) has been made available to the operator.

Although it has been proposed to increase the speed of the recording head by two or three times the normal speed in order to increase video playback quality, such as in U.S. Pat. No. 4,183,067, issued Jan. 8, 1980 for HELICAL SCAN VTR WITH MEANS FOR DISPLACING HEAD TRACK DIRECTION, inventor N. Kihara et al, the system disclosed in this patent is relatively complex and not compatible with conventional consumer magnetic heads and signal processing circuitry. Thus, as disclosed in this patent two video heads are provided which are offset axially and which lay down video information in tracks which extend only one-half the width of the video tape. This is in contrast to the standard consumer VCR which records a field in a single track which extends the entire width of the tape. In the disclosed patent, the field is recorded in two oblique tracks by different vertically offset heads which extend partially across the width of the magnetic tape. As noted, this recording system is incompatible with a conventional consumer VCR and tapes made with such a recorder could not be interchanged with standard cassette tapes. This patent also discloses at Column 2 thereof the use of a recording head the speed of which may be doubled or tripled to expand the frequency range of the recorded signal without increasing the tape guide drum diameter. As disclosed, two or more successive oblique tracks are used for recording each field of the video signal. These tracks extend substantially across the entire width of the tape so that each track records a segment of the field. As noted in this patent, such a system can cause a significant change in the distance between the head switching point with a resulting "jumping jitter" due to skew distortion.

It has also been proposed to use a time division multiplex scheme to record video signals in the 8 mm mode at increased bandwidths using a conventional magnetic head at normal rotational speed. In this "Timplex System" proposed by the BOSCH Company in 1983 to the 8 mm Video Working Group, the color difference chrominance signals R-Y and B-Y are time compressed and recorded in alternate lines along with a time compressed luminance signal in each line. Thus, although the bandwidth of the video signal is increased, vertical color resolution is reduced by one-half since only one color component signal is recorded for each line. Moreover, there is no disclosure of a bi-modal VCR capable of compatibility with a lower resolution conventional format VCR.

Other time division multiplex systems have been proposed but none of them has given the consumer VCR operator the choice of recording in a conventional relatively lower resolution mode or in a higher resolution, higher image quality mode.

SUMMARY OF THE INVENTION

According to the present invention, there is provided video reproduction apparatus which may be operated either in a conventional mode or a high-resolution mode. The invention is especially suitable for use in a light-weight, hand-held consumer VCR where either a camera and recorder are integrated into a single unit, or the camera and recorder are separate lightweight units. The magnetic head and tape drive mechanisms are compatible for either mode of operation. According to an aspect of the invention, the video reproduction apparatus includes circuit means for processing video signals selectively of either a first conventional format of reduced bandwidth, or of a second time-division-multiplex format of greater bandwidth and higher image resolution. Tape moving means are provided for moving the magnetic tape along a path at a first speed and at a second speed greater than and, preferably two times greater than the first speed. A magnetic transducer means coupled to the circuit means is located along the tape path. The transducer means is rotatable at a first rotational speed, and at a second rotational speed greater than and preferably two times greater than the first rotational speed for recording and playing back video signals in parallel tracks on the magnetic tape. The reproduction apparatus includes means for controlling the circuit means, the tape moving means, and the magnetic transducer means to operate in first and second modes. In the first mode, the circuit means processes video signals of the first format, the tape moving means moves the tape at the first speed and the magnetic transducer means is rotated at the first rotational speed to record and/or playback video signals of the first format on the magnetic tape. In the second mode, the circuit means processes video signals of the second time-divisional-multiplex format of greater bandwidth and higher image resolution, the tape moving means moves the tape at a second speed, preferably two times greater than the first speed and the magnetic transducer means is rotated at a second rotational speed greater than, preferably two times greater than, the first speed to record and/or playback video signals of the second format on magnetic tape. (As used herein, it will be appreciated, reference to transducer or head rotation shall mean that rotation which occurs as a result of axial rotation of the drum or the like which supports the transducer or head)

DESCRIPTION OF THE DRAWINGS

In the detailed description of the embodiment of the invention presented below, reference is made to the accompanying drawings in which like elements are numbered with like numbers.

DESCRIPTION OF THE PREFERRED EMBODIMENT

Figure 1:
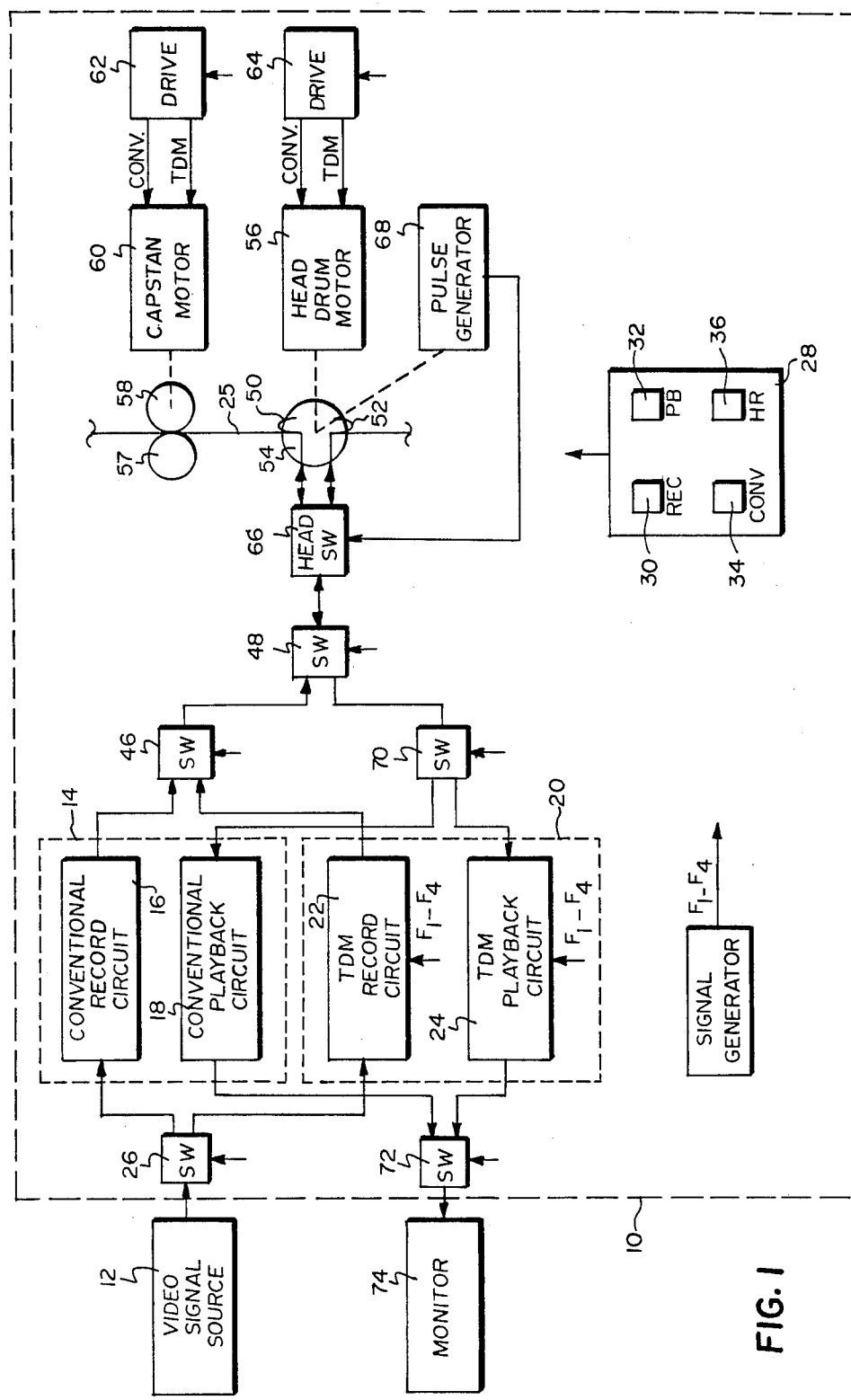
FIG. 1 is a block diagram of a video reproduction apparatus according to the present invention.

Referring now to FIG. 1, there is shown in block diagram a preferred embodiment of video reproduction apparatus according to the present invention which is operable in a first, conventional format mode, and a second high-resolution TDM format mode. In the following description, it will be assumed that a standard NTSC composite color video signal is supplied to the apparatus of the present invention. It will be appreciated, however, that other composite video signal systems such as the PAL and SECAM systems used in Europe may also be used in accordance with the present invention. It will also be appreciated that component video signals such as YIQ component color video signal, Y, R-Y, B-Y component color video signal or RGB component signal may be used in the present invention.

In the NTSC system, approximately thirty frames of color information are transmitted each second, with each frame comprising two interlaced fields. The composite video signal includes a luminance signal which is amplitude modulated on a carrier signal and which has a bandwidth of approximately 4.2 MHz. The NTSC signal also includes I and Q chrominance signals amplitude modulated in quadrature on a subcarrier which has a frequency 3.58 MHz higher than the carrier frequency. The I chrominance signal has a bandwidth of approximately 1.3 MHz and the Q chrominance signal has a bandwidth of approximately 0.5 MHz. A separate audio carrier is located 4.5 MHz from the picture carrier. It will be understood that the color video signal presented to the apparatus of FIG. 1 may also be a component signal such as one having separate luminance and chrominance signals (YIQ format) or such as one having an RGB format.

As shown in FIG. 1, a composite color video signal may be presented to video reproduction apparatus 10 from video signal source 12 such as a camera, or cable, broadcast or satellite transmission. If source 12 is a camera, apparatus 10 may be combined therewith into a combined hand-held unit (camcorder). Source 12 may include a tuner/detector to convert an r.f. signal into a composite video signal. Apparatus 10 includes a conventional format circuit 14 having conventional record circuit 16 and and conventional playback circuit 18 and a high resolution TDM format circuit 20 having TDM record circuit 22 and TDM playback circuit 24.

Figure 3A:
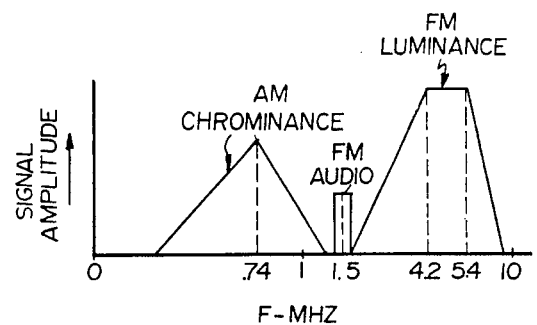
FIGS. 3A and 3B respectively show frequency spectrum diagrams of conventional format and TDM format video signals.

According to the present invention, the composite video signal from source 12 is applied by means of switch 26 to either conventional record circuit 16 or to TDM record circuit 22. Switch 26 is actuated by a signal from control 28 which has "REC" (record) button 30, "PB" (playback) button 32, "CONV" (conventional) button 34 and "HR" (high resolution) button 36, among others (not shown). For the present description, the conventional format will be described as that used in the 8 mm KODAVISION 2400 Camcorder sold by the Eastman Kodak Company of Rochester, N.Y. The KODAVISION Camcorder is an integrated camera and tape recorder which uses 8 mm format video cassettes. The color video signal recorded on the tape is in a "color under" format in which the amplitude modulated luminance signal is modulated on a carrier having a bandwidth of approximately 2.5 MHz, and in which the amplitude modulated chrominance signal is converted from a 3.58 MHz subcarrier frequency to a lower carrier frequency of 743.5 kHz having a bandwidth of about 0.5 MHz. The frequency modulated audio signal is converted from a 4.5 MHz carrier to a 1.5 MHz carrier and recorded with the same heads as are employed for the video signals. The frequency spectrum of the conventional 8 mm format recorded signal is shown in FIG. 3A. (In FIGS. 3A, 3B and 3C, F is represented in log scale)

Figure 2A:
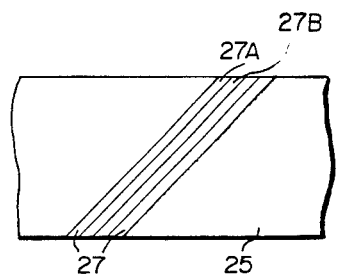
FIGS. 2A and 2B are diagrammatic partial views of video tape which may be used in the apparatus of FIG. 1.

The KODAVISION 2400 Camcorder has two magnetic heads mounted on a rotating drum for recording the conventional video signal in slant tracks across the width of the 8 mm tape such that an entire field of color video signal is recorded in each track. Thus, as shown in FIG. 2A a segment of magnetic tape 25 has recorded thereon a plurality of recording tracks 27. Since a frame of video in the NTSC system has two interlaced fields, a field of video is recorded on each track and two tracks 27A and 27B are used to record the two fields of a single frame of video.

Figure 2B:
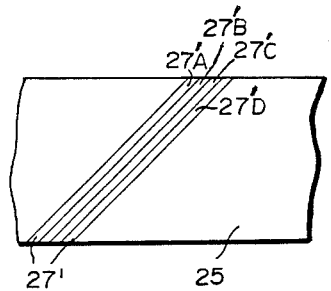

According to the present invention, a high resolution full bandwidth signal may also be recorded on magnetic tape 25, but in a different but physically compatible format than the conventional format used in the present 8 mm KODAVISION Camcorder. The high resolution format is a time division multiplex (TDM) format which is recorded on magnetic tape moved at twice the speed used in recording a conventional format video signal by means of magnetic heads rotated at twice the rotational speed used in conventional recording. In this manner, whereas a single field of a frame is recorded on a single track across the width of the tape in conventional format recording, in the TDM format a single field is recorded on two adjacent tracks. Thus, as shown in FIG. 2B four tracks are used for recording the two fields of a video frame, tracks 27'A and 27'B for recording the first field of a frame, and tracks 27'C and 27'D for recording the second field of the video frame.

Figure 3B:
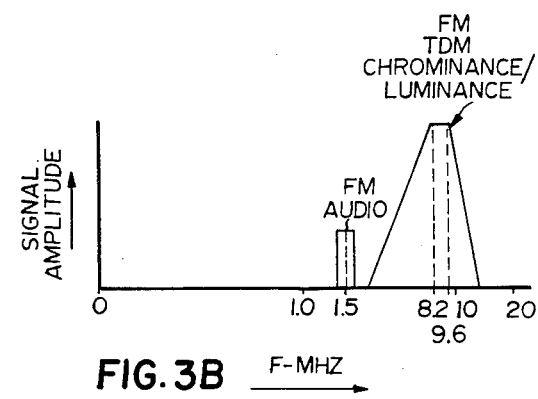
Figure 6:
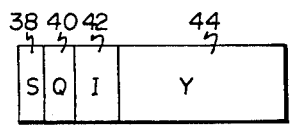
FIG. 6 is a representational time diagram of the TDM signal of FIG. 3B.

When switch 26 is actuated by button 36 on control 28, the composite video signal from source 12 is presented to TDM record circuit 22. Circuit 22 reformats the composite video signal into a TDM signal (FIGS. 3B and 6). The time-division-multiplex format (which will be explained in greater detail later) time compresses the Y luminance and I and Q chrominance signals as well as the sync signal of a line of color video signals, and transmits each TDM segment during a different time period of the line. As shown in FIG. 6 a line of color video signals has been reformatted into an S sync segment 38, I and Q chrominance segments 40 and 42 and a Y luminance segment 44. The TDM signal is frequency modulated on a carrier which is higher in frequency than the carrier used for the luminance signal in the conventional format. In the TDM format, substantially the full signal bandwidths of the composite video signal are used and both the compressed luminance and chrominance signals are frequency modulated. However, to maintain compatibility with the conventional format video signal, the audio signal is frequency modulated on the same carrier (1.5 MHz) as in the conventional format. Thus, the same audio circuitry used with the conventional format may be used in the TDM format, reducing expense and circuit complexity.

Either the conventional format video signal or the TDM format video signal is applied, by means of switch 46 and record/playback switch 48, to a magnetic transducer including magnetic heads 50 and 52 mounted on a head drum 54 rotated by drum motor 56. Magnetic tape 25 is moved past drum 54 at a constant speed by means of pinch roller 57 and capstan 58 which is rotated by means of capstan motor 60.

In the conventional format mode, capstan motor drive 62 causes motor 60 to rotate capstan 58 at a speed so as to move tape 26 along a path past drum 54 at a first tape speed; and drive 64 causes motor 56 to rotate drum 54 at a first rotational speed of 1,800 rpm. When the TDM format video signal is to be recorded on tape 25, capstan motor drive 62 causes motor 60 to rotate capstan 58 at a speed so as to move tape 25 past drum 54 at a second tape speed which is twice the conventional format tape speed. At the same time, drum drive 64 causes drum motor 56 to rotate drum 54 at a rotational speed which is twice the rotational speed of the conventional format recording, i.e. 3,600 rpm. By doubling both the rotational speed of drum 54, and the tape speed of tape 25, a higher head to tape speed is effected which permits reproducingly recording of higher signal frequencies on tape 25 so that substantially the full NTSC signal bandwidth of the video signal may be reproducingly recorded in the TDM format. It will be appreciated that in the conventional format mode, capstan 58 may be rotated at a slower speed to effect longer recording time on the magnetic tape. Thus, at half the conventional tape speed, the recording time would be doubled.

Switching is effected between heads 50 and 52 by means of head switch 66 which is actuated by pulse generator (PG) 68 rotated at the same speed as drum 54. In this manner, the video signal is alternately supplied to one of heads 50, 52 for recording on tape 25.

To implement the playback mode, switch 48 is actuated by button 32 on control 28 to supply video signals to playback circuit 20. Depending upon whether conventional format video information or TDM format video information had been recorded on tape 25, switches 70 and 72 will be actuated according to permit processing of the conventional format recorded video signal by conventional playback circuit 22, or to permit processing of the TDM format recorded video signal by TDM playback circuit 24. Again, depending upon the format of the signal recorded on tape 25, drives 62 and 64 will be set to drive motors 60 and 62 and consequently capstan 58 and head drum 54 respectively at either the conventional format speeds or at the doubled TDM format speeds. Playback circuits 18 and 24 process the respective signals applied to them into an NTSC composite video signal which is applied to monitor 74 for display.

Figure 4:
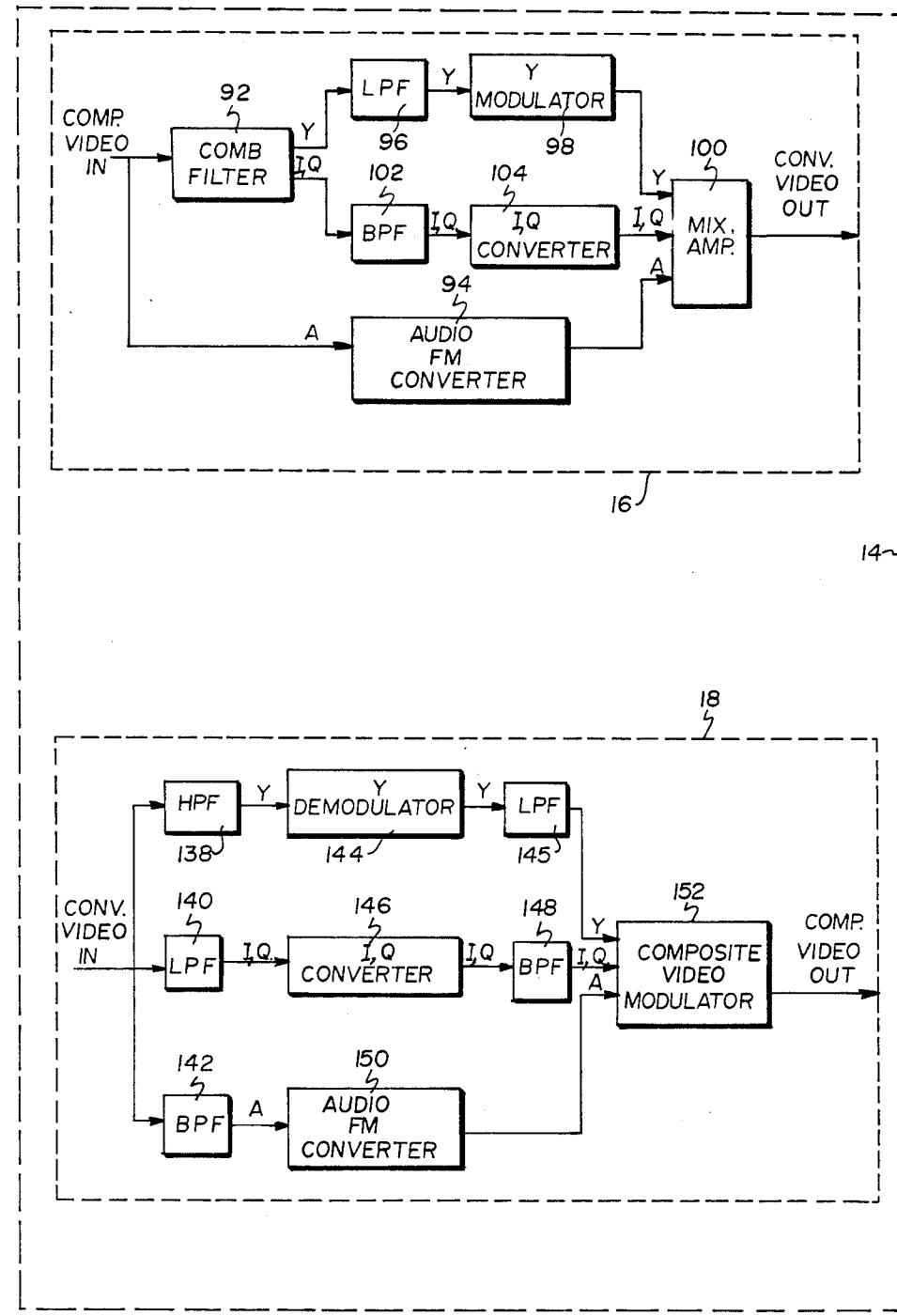
FIG. 4 is a block diagram of the conventional record/playback circuit of the apparatus of FIG. 1.

Referring now to FIG. 4, there is shown in greater detail conventional record circuit 16. As shown, in the record mode the composite video signal is applied to a comb filter 92 which separates the Y luminance signal from the I and Q chrominance signals. The composite video signal is also applied to an audio FM converter 94 which converts the FM audio signal from a 4.5 MHz carrier to a 1.5 MHz carrier. The Y signal is applied to a low pass filter 96 which limits the bandwidth of the Y signal to approximately 3.0 MHz so that the chrominance signals carried on the 3.58 MHz subcarrier do not interfere with the luminance signal. The Y signal is then modulated on an FM carrier by means of Y modulator 98, and the modulated FM signal applied to mixing amplifier 100. The I and Q chrominance signals are applied to a band pass filter 102 which passes only a band of signals centered on the 3.58 MHz chrominance subcarrier and 0.5 MHz bandwidth on either side thereof. This bandwidth limited signal is then applied to IQ converter 104 which converts the I and Q chrominance signals to a lower frequency carrier of 743 kHz, having a bandwidth of 0.5 MHz above and below the carrier frequency. This amplitude modulated "color under" signal is applied to mixing amplifier 100 along with the FM audio carrier signal at 1.5 MHz. The combined signal has the frequency spectrum as shown in FIG. 3A.

Figure 3C:
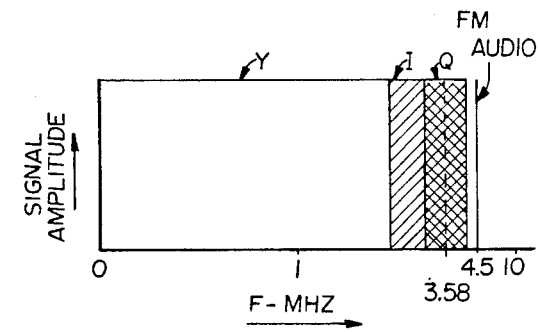
FIG. 3C is a frequency spectrum diagram of an NTSC composite, color video signal.
Figure 5:
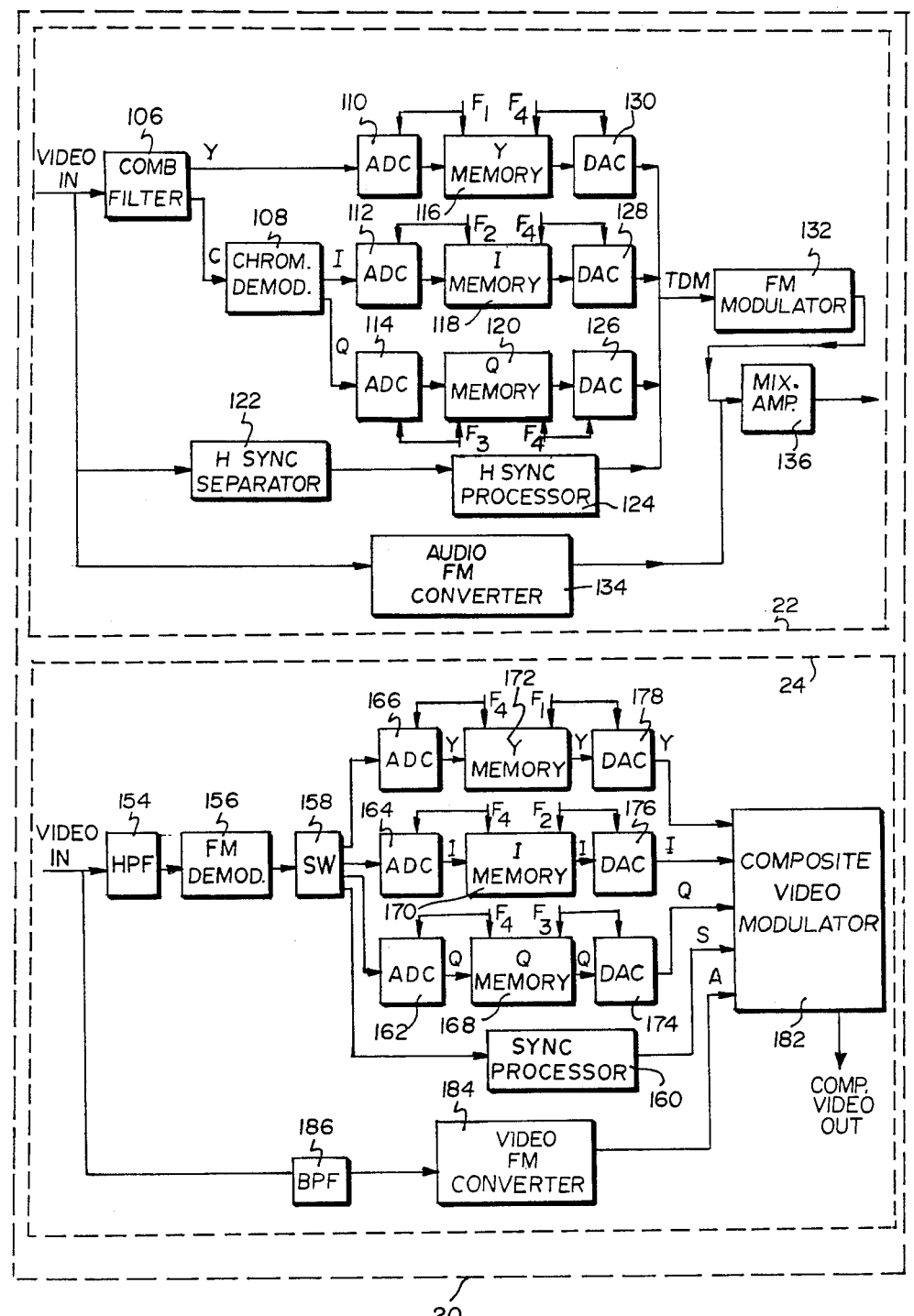
FIG. 5 is a block diagram of the TDM record/playback circuit of the apparatus of FIG. 1.

Referring now to FIG. 5, there is shown in detail TDM record circuit 22 of the apparatus of FIG. 1. As shown, the composite video signal in NTSC format of FIG. 3C is applied to comb filter 106 which separates the Y luminance signal and the C chrominance signal. The C signal is applied to chrominance demodulator 108 which demodulates it into I and Q chrominance signals. The Y, I and Q signals are respectively supplied to analog to digital converters (ADC) 110, 112, and 114.

The Y digital signal is written into Y digital memory 116 at a write signal frequency $f_1$; the I digital signal is written into I digital memory 118 at a write frequency $f_2$ and the Q digital signal is written into Q digital memory 120 at a write frequency of $f_3$. The frequencies $f_1$, $f_2$, and $f_3$ are chosen to satisfy the sampling theory and are equal to at least twice the highest frequency of the respective signal bandwidth. Recognizing that the Y signal has a bandwidth of 4 MHz, $f_1$ is chosen to have a frequency of 14.097 MHz which is greater than two times the bandwidth of the Y luminance signal; $f_2$ is chosen to have a frequency of 4.027 MHz which is more than two times the bandwidth of the I chrominance signal of approximately 1.2 MHz; and $f_3$ is chosen to have a frequency of 2.013 MHz, which is more than two times greater than the bandwidth of the Q chrominance signal of 0.5 MHz.

A horizontal (H) sync separating circuit 122 and an H sync processing circuit 124 are also provided to separate the horizontal sync pulse from the incoming composite video signal, and to transform it into a durationally shorter pulse for insertion into the TDM signal.

The TDM signal shown in FIG. 6 is formed by sequentially actuating the H sync processing circuit 124 to produce the S sync segment 38, the Q memory 120 to produce the Q segment 40, the I memory 118 to produce the I segment 42, and the Y memory 116 to produce the Y segment 44. Memories 116, 118, and 120 are read out at a frequency $f_4$ which is greater than frequencies $f_1$, $f_2$, and $f_3$ to compress the time domain of the Y, I, Q signals so that they may be sequentially read out over the time period of a line. To this end, read frequency $f_4$ is chosen to be 18.125 MHz. The digital signals read out sequentially from memories 118, 120, and 116 are applied respectively to digital to analog converters (DAC) 126, 128, and 130 which convert the digital signals to compressed analog signals. The TDM signal is then applied to an FM modulator 132 which modulates the TDM signal onto an FM carrier. For the purposes of the present illustration, the FM carrier has a sync tip at 8.2 MHz and a peak white frequency of 9.6 MHz with upper and lower side bands of approximately 5 MHz. (FIG. 3b)

The FM audio signal of the composite video signal is converted from 4.5 MHz to 1.5 MHz, and mixed with the FM TDM signal in mixing amplifier 136 for presentation to the recording heads.

Referring again to FIG. 4, there is shown in greater detail the conventional playback circuit 18 of FIG. 1. As shown, the conventional format video signal (FIG. 3A) which had been recorded on tape 25 is applied to a high pass filter (HPF) 138 which separates the Y luminance FM signal from the conventional format video signal; to a low-pass filter (LPF) 140 which separates the chrominance AM signal from the conventional format video signal, and to a band-pass filter (BPF) 142 having a center frequency of 1.5 MHz to separate out the audio FM signal. The Y FM signal is applied to an FM demodulator 144 which produces a Y luminance signal which is further applied to a low-pass filter (LPF) 145 to remove any undesirable high frequency components. The I,Q chrominance signal is supplied from LPF 140 to a chrominance converter circuit 146 which converts the low frequency chrominance signal to the 3.58 MHz subcarrier chrominance signal. This signal is then passed through a band-pass filter (BPF) 148 to remove any extraneous signals. Audio FM converter 150 converts the 1.5 MHz FM audio signal to the 4.5 MHz FM audio signal.

The luminance, chrominance and audio signals are then applied to composite video modulator 152 which produces an NTSC composite color video signal such as that shown in FIG. 3C.

Referring again to FIG. 5, there is shown in greater detail the TDM playback circuit 24 of FIG. 1. As shown, the TDM signal received from the magnetic heads 50 and 52 is applied to a high pass filter (HPF) 154 which passes only the TDM high frequency FM signal. This signal is then applied to FM demodulator 156 which produces the TDM signal shown in FIG. 6. This TDM signal is sequentially applied by means of rotary switch 158 to sync processing circuit 160, Q signal analog to digital converter (ADC) 162, I signal ADC 164, and Y signal ADC 166. The Q, I and Y digital signals are then expanded in time by being written into Q memory 168, I memory 170, and Y memory 172, respectively, at a write frequency of $f_4$ and being read out of these memories, simultaneously, and, respectively, at reduced read frequencies. Thus, the Q signal is read out of Q memory 168 at a frequency of $f_3$, the I signal is read out of I memory 170 at a frequency of $f_2$ and the Y signal is read out of Y memory 172 at a frequency $f_1$. The Q, I and Y digital signals are then converted to analog signals respectively by Q signal digital to analog converter (DAC) 174, I signal DAC 176, and Y signal DAC 178. The Y luminance signal, the I, Q chrominance signals, and the sync signal are then supplied simultaneously to composite signal modulator 182. Modulator 182 is also supplied a converted FM audio signal from audio FM converter 184 which has converted the 1.5 MHz FM audio signal separated from the TDM signal by band-pass (BPF) filter 186 to a 4.5 MHz FM audio signal. Modulator 182 produces the composite NTSC video signal of FIG. 3C from the audio signal, the sync signal, and the luminance and chrominance signals.

Although the TDM record and playback circuits have been described above as using digital memories, it will be understood that pure analog memories (e.g., CCD memories) or hybrid analog-digital memories may also be used to process the TDM signals. Moreover, although digital memories used for the Y, I and Q signals are illustrated as separate units, these memories may be combined into a single memory. Although the memories and analog-to-digital and digital-to-analog converters are shown as separate units for the record and playback circuits it is apparent that, with appropriate switching one set of memories and converters could be used for both record and playback functions. Similarly, the same audio converter circuits may be used for both conventional and TDM modes of operation. It is also apparent that although two magnetic heads are shown, one magnetic head or more than two magnetic heads may be used for recording and playing signals on magnetic tape with appropriate changes in tape and head speeds. Other TDM formats may be used as well as other read and write frequencies to compress and expand the TDM signal segments. Other high resolution formats may be used also.

Although the TDM format signal is disclosed as being recorded and played back at a magnetic head rotational speed which is twice the conventional format head speed and on magnetic tape which is moved past the magnetic head at twice the conventional format tape speed, it will be appreciated that other rotational speeds of the magnetic head and other tape speeds may be used which are greater than the speeds used in conventional format recording and playback. Specifically, the concept maintains compatibility for all tape speeds such that $$S_{HR}/S_{CONV} = W_{HR}/W_{CONV}$$

where $S_{HR}$ is tape speed for high resolution mode,
where $S_{CONV}$ is tape speed for conventional mode,
where $W_{HR}$ is drum (head) rotational velocity for high resolution mode, and
where $W_{CONV}$ is drum (head) rotational speed for conventional mode. In this way, the magnetic track patterns are identical and magnetic head widths are the same.

The invention has been described in detail with particular reference to preferred embodiments thereof, but it will be understood that variations and modifications can be effected within the spirit and scope of the invention.

What is claimed is:

1. Video reproduction apparatus comprising:
   circuit means for selectively processing video signals either of a first conventional format of reduced bandwidth or of a second high resolution format of greater bandwidth than that of said first format;
   tape moving means for moving magnetic tape along a path at a first speed and at a second speed greater than said first speed;
   magnetic transducer means, coupled to said circuit means and located along said tape path for recording and/or playing back video signals in parallel tracks on said magnetic tape;
   means for rotating said magnetic transducer means at a first rotational speed and at a second rotational speed greater than said first rotational speed; and
   means for controlling said circuit means, said tape moving means and said magnetic transducer rotating means to operate (1) in a first mode in which said circuit means processes video signals of said first format, said tape moving means moves said tape at said first speed and said magnetic transducer rotating means rotates said magnetic transducer means at said first rotational speed to record and/or playback said video signals of said first format on said magnetic tape and (2) in a second mode in which said circuit means processes video signals of said second format, said tape moving means moves said tape at said second speed and said magnetic transducer rotating means rotates said magnetic transducer means at said second rotational speed to record and/or playback said video signals of said second format on said magnetic tape.

2. The apparatus of claim 1 wherein in said second mode, said controlling means controls said tape moving means to move said tape at a second speed which is twice the first speed and said magnetic transducer rotating means to rotate said magnetic transducer means at a second rotational speed which is twice the first rotational speed.

3. The apparatus of claim 1 wherein said circuit means processes a video signal of a second format which is a time-division-multiplex (TDM) format.

4. The apparatus of claim 1 wherein said circuit means includes both record and playback circuits.

5. Video reproduction apparatus comprising:
   circuit means for selectively processing video signals either of a first conventional format of reduced bandwidth or of a second time-division-multiplex (TDM) format of greater bandwidth than said first format;
   magnetic tape moving means for moving magnetic tape along a path at a first tape speed and at a second speed two times greater than the first speed;
   magnetic transducer means coupled to said circuit means and located along said tape path for recording and/or playing back video signals in parallel tracks on said magnetic tape;
   means for rotating said magnetic transducer means at a first rotational speed and at a second rotational speed two times greater than said first rotational speed; and
   means for controlling said circuit means, said tape moving means and said magnetic transducer rotating means to operate (1) in a first mode in which said circuit means processes video signals of said first format, said tape moving means moves said tape at said first speed and said magnetic transducer rotating means rotates said transducer means at said first rotational speed to record and/or playback said video signals of said first format on said magnetic tape and (2) in a second mode in which said circuit means processes video signals of said second format, said tape moving means moves said tape at said second tape speed and said magnetic transducer rotating means rotates said magnetic transducer means at said second rotational speed to record and/or playback said video signals of said second format on said magnetic tape.

6. The video reproduction apparatus of claim 5 wherein said circuit means includes only playback circuit means for playing back from said magnetic tape video signals of said first and second format recorded thereon.

7. The video reproduction apparatus of claim 5 wherein said circuit means includes record and playback circuits for both recording and playing back video signals of said first and second formats on said magnetic tape.

8. The video reproduction apparatus of claim 5 wherein said circuit means includes a conventional format circuit for processing composite color video signals into a "color under" format in which the chrominance signal is amplitude modulated on a low frequency carrier and said luminance signal is frequency modulated on a higher frequency carrier such that said chrominance signal bandwidth and said luminance signal bandwidth are separate and wherein said circuit means also includes a TDM format circuit for processing composite color video signals into a TDM format in which the chrominance and luminance signals are separate signal segments which are frequency modulated on the same high frequency carrier.

9. The video reproduction apparatus of claim 8 wherein said apparatus includes audio processing circuitry which modulates the audio signal on a carrier which is the same for both said conventional format and said TDM format.

10. The video reproduction apparatus of claim 5 wherein said magnetic transducer means includes a pair of magnetic heads and wherein in said first mode of operation said rotating means rotates said heads at 1800 revolutions per minute to record and playback a field of video in a single track on said magnetic tape and wherein in said second format, said rotating means rotates said heads at 3600 revolutions per minute to record and playback a field of information in two adjacent tracks on said magnetic tape.

* * * * *